Patented June 6, 1950

2,510,567

UNITED STATES PATENT OFFICE 2,510,567

POLYTHIOESTERS AND PREPARATION THEREOF

Paul J. Flory, Kent, Ohio, assignor to Wingfoot Corporation, Akron, Ohio, a corporation of Delaware No Drawing. Application November 2, 1946, Serial No. 707,529

10 Claims. (Cl. 260—78.4)

This invention relates to a new class of polymeric compositions and, more specifically, to polythioesters and to a method of preparing them by the interaction of dimercaptans and the acid chlorides of dibasic acids.

The purpose of this invention is to prepare from the above-mentioned reactants an entirely new class of polymers which are more stable and have higher melting points than similar polymers which are made by the reaction of glycols with dibasic acids. A further purpose of this invention is to provide a method of preparing polythioesters, which cannot be satisfactorily prepared by reacting dimercaptans with dibasic acids, by analogy to methods used in the prior art to prepare polyesters. A further purpose of the invention is to prepare very high molecular weight polymers in a short period of time.

In the practice of this invention, there are reacted with dimercaptans the acid chlorides of dibasic acids having the structural formula

in which R is a divalent radical of the group consisting of hydrocarbon, oxahydrocarbon, and thiahydrocarbon radicals, in which the carbonyl groups of the general formula are attached to different carbon atoms of said R radical. The dimercaptans with which these acid chlorides are reacted have the structural formula

HS—R'—SH    (B)

in which R' is an organic radical of the group consisting of hydrocarbon, oxahydrocarbon, and thiahydrocarbon radicals and in which the mercapto groups are attached to different carbon atoms of said R' radical. The reactants condense to form polymers having the structural formula

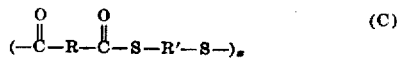

wherein the R and R' groups are the same as in formulae A and B and $x$ is a large whole number indicative of the extent of condensation.

Dimercaptans which are useful in the practice of this invention are the aliphatic hydrocarbon dimercaptans, including polymethylene dimercaptans, such as ethylene dimercaptan, trimethylene dimercaptan, tetramethylene dimercaptan, hexamethylene dimercaptan, and decamethylene dimercaptan, the oxahydrocarbon dimercaptans, such as 3-oxa-1,5-dimercapto-pentane (HS—CH₂CH₂—O—CH₂—CH₂SH)

3,6-dioxa-1,8-dimercapto-octane, (HS—CH₂CH₂—O—CH₂CH₂—OCH₂CH₂SH)

and 4-oxa-1,7-dimercapto-heptane (HS—CH₂CH₂CH₂—O—CH₂CH₂CH₂SH)

the thiahydrocarbon dimercaptans, such as 3-thia-1,5-dimercapto-pentane (HS—CH₂CH₂—S—CH₂CH₂—SH)

and 4-thia-1,7-dimercapto-heptane (HS—CH₂CH₂CH₂—S—CH₂CH₂CH₂—SH)

the araliphatic dimercaptans, including hydrocarbon, oxahydrocarbon, and thiahydrocarbon araliphatic dimercaptans, such as the ortho, meta-, and para-xylylene dimercaptans and the following dimercaptans:

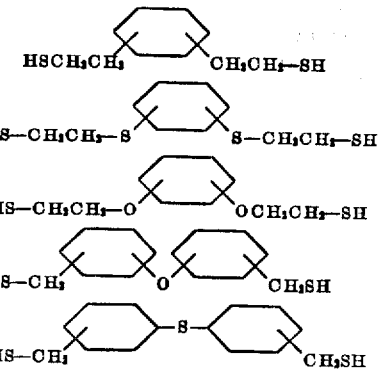

Thus, the araliphatic dimercaptans comprise those in which the aromatic portion of the araliphatic radical is hydrocarbon and in which the aliphatic portions are selected from the group consisting of hydrocarbon, oxahydrocarbon and thiahydrocarbon groups, the free valences of the araliphatic radical being in the aliphatic portions.

Although any of the above-described dimercaptans are useful in making polymeric compositions, if polymers of particular value in various extruded, molded, or otherwise shaped articles (e. g., synthetic fibers, films, molded plastics, electrical insulation, etc.) are desired, there should be a chain of at least four atoms between or directly connecting the two mercapto radicals.

Valuable polymeric compositions may also be prepared from the arylene dimercaptans such as

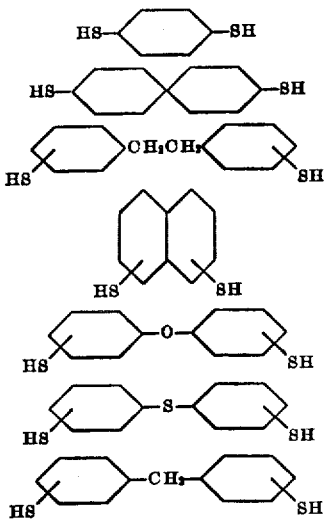

The dimercaptans as above described are condensed with the acid chlorides of dibasic acids which have in the shortest chain between the two carbonyl groups, a chain of at least two atoms and which have the carbonyl groups attached to separate carbon atoms of said chain. A preferred group of the acid chlorides are those which have at least three atoms in the shortest chain between the carbonyl groups and which have the carbon atoms in the terminal positions to which the carbonyl groups are attached. Useful acid chlorides are those having the structural formula

wherein the R group is a divalent hydrocarbon, oxahydrocarbon, or thiahydrocarbon radical, and in which the carbonyl groups are attached to different carbon atoms. Thus, the useful acid chlorides include those in which the R group is ethylene, 1,2-propylene, trimethylene, tetramethylene, hexamethylene, octamethylene, decamethylene, o-phenylene, p-phenylene, m-phenylene, the various isomeric naphthalene, xylylene, diphenylene, dinaphthylene, 3-oxa-pentamethylene

and 3-thia-1,2-pentamethylene

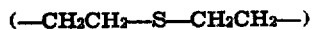

radicals, other aliphatic and aromatic hydrocarbon radicals, homologues thereof, and the oxahydrocarbon and thiahydrocarbon radicals, in which a sulfur or an oxygen atom is substituted for one or more $CH_2$ groups of the hydrocarbon radicals.

It will be noticed that succinyl chloride and phthalyl chloride are operative in the practice of this invention and are included within the broad scope of the defined acid chlorides, but are not included within the defined scope of the preferred compositions because in general the polymers obtained from them are relatively low in molecular weight, and hence are less suitable for the production of molded, extruded or otherwise shaped articles of high strength and toughness.

Many of the above-defined dimercaptans are compositions known to the art, the preparations of which are described in chemical literature. Those which are not known and described may be prepared from the corresponding glycols by well known reactions. The glycols are first converted to the dihalides by reaction with a hydrogen halide, and subsequently converted to the dimercaptans either by reaction with alkali metal hydrosulfides, or by reaction with thiourea to form the dithiouronium salt which on hydrolysis with alkali yields the dimercaptan.

Similarly, the acid chlorides may be prepared from the corresponding dibasic acids by reaction with thionyl chloride or phosphorus pentachloride.

The condensation process is best conducted in a closed reaction vessel, preferably of glass, or glass-lined, from which all traces of oxygen are excluded. Ordinarily, all of the reactants are charged to the reactor at the outset but, in some cases, the acid chloride may be added portionwise, or continuously during the course of the polymerization, to the dimercaptan originally charged to the reactor. When the acid chloride is a higher melting solid, continuous addition is not practicable and all of the reactants are charged initially. Throughout the reaction a stream of oxygen-free nitrogen, or other chemically inert gas, is passed through the reaction mass to prevent accumulation of traces of oxygen and to sweep out the hydrogen chloride generated by the condensation reaction. Accordingly, the reactor must be provided with an exit for the gaseous reaction products and the stream of inert gas. The exit tube is preferably connected to a gas-absorption trap, and provision should be made for applying vacuum (100 mm. of mercury absolute pressure or less) at the outlet of the trap.

The gas inlet tube may also be used as a viscometer by which the progress of the chemical reaction may be followed. This method of measuring melt viscosities is more fully described in the Journal of the American Chemical Society, vol. 62, page 1057.

The reaction is carried out by mixing approximately equimolecular proportions of the dibasic acid chloride and a dimercaptan. In the preparation of polythioesters of the desirable high molecular weight, the proportion of the reactants is of critical importance. If slight excesses of dimercaptans are used, very high molecular weights can be achieved in very short periods of time. However, if large excesses, for example more than about 2 percent, of the dimercaptans are used, condensation polymers of only moderate molecular weight are obtained. On the other hand, if appreciable excesses of acid chlorides are used, the viscosity and molecular weight continue to increase with further heating and ultimately gelation occurs after which the product is unsuitable for molding, extrusion or other fabrication operation. Thus, polythioesters prepared from an excess of acid chloride at best are unstable with respect to further heating. Usually they are badly discolored. For these reasons the use of an excess of the acid chloride is not recommended. In general, the best results are achieved by mixing equimolecular proportions of the reactants, or by using a small excess (about 2 percent or less) of the dimercaptan. In some cases, where one or the other of the reactants is volatile, it may be necessary to compensate for evaporation losses by supplying slight excesses of the more volatile reactant. When condensation polymers of moderate or low molecular weight are desired, an excess of the dimercaptan may be deliberately supplied.

Frequently it is preferred to mix the reactants (if they are liquid) at temperatures around 0° C. On warming to room temperature, the reaction begins spontaneously, the heat evolved causing a further rise in temperature. Sometimes it is necessary to warm the mixture to somewhat higher temperatures in order to start the reaction; in particular, if one or the other, or both, of the reactants is a solid, then the mixture should, if possible, be warmed to secure a homogeneous phase before the reaction proceeds very far. Once the reaction is initiated, it proceeds rapidly, and, being exothermic in nature, is accompanied by an increase in the temperature of the reaction mass. With larger batches, mechanical agitation and provision for cooling may be required. Within a few minutes a solid, low molecular weight polythioester is formed, and in order to achieve the desirable higher molecular weight it is necessary to increase the temperature of reaction to at least 120° C., or to a point above the melting point of the low molecular weight polymer initially formed. The temperature employed at the end of the reaction is usually about 200° C. or above. As the reaction proceeds, a steadily increasing viscosity, and correspondingly increasing molecular weight, will be observed, and after a few minutes at temperature at or above 200° C., molecular weights in excess of 10,000 are achieved.

Polythioesters usually are crystalline at room temperature. They melt sharply over a range of a few degrees at most, their melting points depending on the particular combination of dimercaptan and dibasic acid chloride employed. In a number of cases melting points in the vicinity of, or exceeding, 200° C. are observed. Polythioesters generally melt from 25° to 100° C. higher than the corresponding polyesters. X-ray diffraction shows the characteristic patterns for a highly crystalline polymer. When the polymer in the form of a fiber or film has been cold drawn with an increase in length of three- to five-fold, or more in some cases, its X-ray diagram shows a typical fiber pattern, thus indicating characteristic orientation parallel to the fiber axis.

Some of the polythioesters, e. g., p-xylylene dithioisophthalate and tetramethylene dithioisophthalate, can be cooled to amorphous masses which refuse to crystallize even on long standing at room temperature. On warming to higher temperatures, or on cooling very slowly from the melt above the freezing point, crystallization occurs, as evidenced by the development of opacity throughout the polymer.

Mixed polymers or interpolymers of the polythioesters may be prepared by condensing a plurality of different dimercaptans with a single dibasic acid chloride, a plurality of dibasic acid chlorides with a single mercaptan, or a plurality of dimercaptans with a plurality of the dibasic acid chlorides. In all of these cases, however, the total molecular quantities of dimercaptans should be approximately equivalent to the total molecular quantities of the dibasic acid chlorides. The invention as hereunder claimed is intended to cover compositions made by these methods as well as the normal polythioesters made by the condensation of a single dimercaptan with a single dibasic acid chloride. These mixed polymers or interpolymers generally have somewhat different properties than the normal polythioesters; their melting points are lower, and when mixtures of reactants are employed, including those of widely different molecular chain lengths, the resulting superpolymer may be entirely non-crystalline. Such products generally are unsuitable for fiber formation, but may be used in molding operations, in sheet formation, as coating compositions, and as electrical insulation.

Further details of the preparation of the new condensation polymers are set forth with respect to specific preparations as described in the following examples.

*Example 1*

A glass reaction vessel was provided with a glass inlet tube which was so adapted that the end thereof could be immersed in the reaction mass within the vessel. The vessel was also provided with a suitable gas exit connected through an absorption trap to a water aspirator. The reaction vessel was then charged with 5.781 parts by weight of sebacyl chloride and then a stream of dry oxygen-free nitrogen was passed through the apparatus. After the reaction vessel was immersed in an ice bath and cooled to approximately 0° C., 3.716 parts by weight of hexamethylene dimercaptan were slowly added. These proportions represented a 2.4 percent molar excess of the dimercaptan. At the temperature of the ice bath, no evidence of chemical reaction was observed. The reaction vessel was then removed from the ice bath and allowed to warm up to room temperature. The reaction vessel contents were stirred by immersing the gas inlet tube in the reaction mass and allowing nitrogen to bubble through the mixture. As the temperature increased, the condensation reaction began and a steady stream of hydrogen chloride was liberated. The rate of reaction increased, gradually at first and then finally proceeded vigorously, until the contents of the reaction vessel became solidified. This took place approximately 10 minutes after the reagents were mixed.

The temperature of the reaction mass was increased to 110° by application of heat and after 10 minutes the temperature was increased to 218° C. in order to complete the reaction. This temperature was maintained for one hour. The vessel was then evacuated to remove entrapped hydrogen chloride and was swept out three times with dry oxygen-free nitrogen. At this point, the melt viscosity was 216 poises at 218° C.

The polymer was a hard, white opaque mass at room temperature. It had a melting point of 107–109° C. and the molten polymer could be extruded in the form of fibers which were capable of being cold-drawn with an accompanying increase in tensile strength.

*Example 2*

Using the apparatus described in the preceding example, 4.795 parts by weight of pentamethylene dimercaptan and 7000 parts of terephthalyl chloride were condensed. Both of the reactants were charged to the reaction vessel at once. To initiate the reaction, the temperature was raised to a point above the melting point of the terephthalyl chloride. Since the melting point of the polymer exceeded 218° C., it was necessary to complete the reaction at an even higher temperature, a temperature slightly above the melting point being used. The first phase of the reaction was carried out at 110° C. and the reaction was completed at 255° C. The final viscosity was 3500 poises at 255° C.

At room temperature the pentamethylene dithioterephthalate polymer was an opaque crystalline mass with a pinkish cast. The melting point was 231–32° C. Fibers formed from this polymer were quite stiff. By maintaining the extruded fibers at a temperature slightly above their melting point for a brief interval before cooling (or quenching in cold water), they could be cold-drawn subsequently with resulting increase in strength.

Example 3

Using the apparatus described in Example 1 and a slightly modified procedure, 5.368 parts by weight of adipyl chloride and 5.05 parts of p-xylylene dimercaptan were condensed. Since the dithiol was solid and the adipyl chloride was liquid, the procedure was modified by charging the dimercaptan to the reaction vessel and slowly adding the adipyl chloride through a dropping funnel. The mixture was then warmed to 110° C. and the reaction proceeded vigorously until a solid, low molecular weight polymer was formed. The reaction was then completed by heating for one hour at 218° C. At the final reaction temperature the melt viscosity was found to be 245 poises. The condensation polymer was a crystalline, brown solid which was readily spun into fibers. The polymer melted at 168–170° C. The fibers were capable of undergoing cold-drafting to increase their tensile strength.

Using the apparatus and procedures analogous to those described in the above three examples, various other dimercaptans and acid chlorides of dibasic acids were reacted in accordance with the following reaction

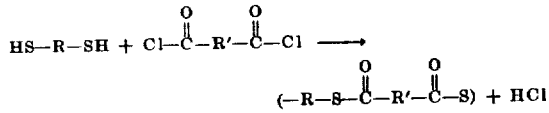

wherein R represents the divalent radical between the sulfur groups in the aliphatic dimercaptan and R' represents the divalent radical between the carbonyl groups in the aliphatic acid chlorides. The following table shows the results of these condensation reactions by means of viscosity and melting point measurements; the footnotes thereunder indicate the nature of the polymer and its utility in the fabrication of synthetic fibers and other articles. The term "crystalline" indicates the occurrence of at least partial crystallinity within the polymer, in accordance with accepted usage of the term. In all cases the reactions were conducted for one hour at the indicated temperature.

| Dimercaptan | Acid Chloride R' | Per cent Excess Dithiol | Final Reaction Temp., °C. | Viscosity, Poises | Melting Point, °C. | Remarks |
|---|---|---|---|---|---|---|
| —(CH$_2$)$_{10}$— | —(CH$_2$)$_4$— | 0.0 | 218 | 2,300 | 100–103 | (a) |
| —(CH$_2$)$_5$— | —(CH$_2$)$_4$— | 0.5 | 218 | 720 | 113–115 | (b) |
| —(CH$_2$)$_4$— | ...do... | none | 218 | 19,000 | 125–128 | (c) |
| —(CH$_2$)$_4$— | —(CH$_2$)$_8$— | 1—0.8 | 218 | 1,870 | 95–98 | (d) |
| —(CH$_2$)$_3$— | ...do... | none | 110 | 1.57 | | (e) |
| —(CH$_2$)$_{10}$— | terephthalyl | 2.4 | 218 | 3,290 | 200–01 | (f) |
| —(CH$_2$)$_4$— | ...do... | ² 1.25 | 340 | | 310 | (g) |
| —(CH$_2$)$_5$— | isophthalyl | ² 3.5 | 218 | 660 | 110–113 | (h) |
| —(CH$_2$)$_5$— | ...do... | ² 4.1 | 218 | 386 | 104–106 | (i) |
| —(CH$_2$)$_4$— | ...do... | ² 6.5 | 218 | 198 | 162–165 | (j) |
| —(CH$_2$)$_3$— | ...do... | ² 6.1 | 218 | 10,000 | | (k) |
| p-xylylene | —(CH$_2$)$_4$— | 0.9 | 218 | 1,360 | 168–170 | (l) |
| Do | isophthalyl | ² 4.5 | 237 | 785 | 200–210 | (m) |

¹ Excess acid chloride.
² Appreciable amounts of dimercaptan lost by volatilization during reaction.

*Remarks*

(a) Amber crystalline solid polymer. Can be extruded in the form of fibers which undergo cold-drawing with drafting ratio over 5:1 (final length:initial length).
(b) Light tan crystalline solid. Fibers can be cold-drawn. Good strength.
(c) Brown crystalline solid. Yields cold-drawn fibers of good strength.
(d) Tan crystalline solid. Fibers can be cold-drawn.
(e) Dark colored liquid. Molecular weight is low.
(f) Crystalline solid. Fibers can be extruded from the melt, and with proper heat conditioning can be cold-drawn to give strong fibers having a high stiffness. Insoluble in water and organic solvents.
(g) Crystalline solid, infusible without decomposition.
(h) White crystalline solid.
(i) Light yellow crystalline polymer. Fibers are rubbery but can be cold drawn to tough filaments.
(j) Slightly yellow, crystalline polymer. Can be molded in various forms, or spun into fibers.
(k) Very dark, non-crystalline polymer. Decomposes slowly during heating.
(l) Crystalline solid. Can be extruded in form of fibers or films. Cold draws readily.
(m) Polymer supercools easily, but can be obtained in semi-crystalline form by very slow cooling from temperatures above 200° C. Can be spun into fibers which can be cold drawn.

Although the invention has been described with respect to specific embodiments thereof, it is not intended that the details shall be construed as limitations upon the scope of the invention except to the extent incorporated in the following claims.

I claim:

1. A polythioester prepared by the condensation of equimolecular proportions of pentamethylene dimercaptan and terephthalyl chloride.

2. A method of preparing polythioesters which comprises mixing equimolecular proportions of pentamethylene dimercaptan and terephthalyl chloride, and heating said mixture until a high molecular weight condensation product is formed.

3. A polythioester prepared by the condensation of equimolecular proportions of para-xylylene dimercaptan and adipyl chloride.

4. A method of preparing polythioesters which comprises mixing equimolecular proportions of paraxylylene dimercaptan and adipyl chloride, and heating said mixture until a high molecular weight condensation product is formed.

5. A polythioester prepared by the condensation of equimolecular proportions of tetramethylene dimercaptan and adipyl chloride.

6. A method of preparing polythioesters which comprises mixing equimolecular proportions of tetramethylene dimercaptan and adipyl chloride, and heating said mixture until a high molecular weight condensation product is formed.

7. A polythioester prepared by the condensation of equimolecular proportions of a diacyl chloride of a hydrocarbon wherein the shortest chain between the carbonyl groups contains at least three atoms, and a dimercapto hydrocarbon wherein the shortest chain between the mercapto groups contains at least four atoms.

8. A method of preparing polythioesters which comprises mixing equimolecular proportions of a diacyl chloride of a hydrocarbon wherein the shortest chain between the carbonyl groups contains at least three atoms, and a dimercapto hydrocarbon wherein the shortest chain between the mercapto groups contains at least four atoms, heating said mixture until substantial condensation has taken place, and separating the resulting polymer.

9. A polythioester prepared by the condensation of at least one acid chloride of a dibasic acid having a structural formula

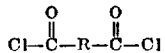

wherein R is a divalent radical of the group consisting of aliphatic hydrocarbon, oxahydrocarbon and thiahydrocarbon radicals and aromatic hydrocarbon radicals and wherein the carbonyl groups are attached to separate carbon atoms, and at least one dimercaptan having the structural formula

HS—R'—SH wherein R' is a divalent radical of the group consisting of aliphatic hydrocarbon, oxahydrocarbon and thiahydrocarbon radicals, arylene radicals, and araliphatic radicals in which the aromatic portion is hydrocarbon and in which the aliphatic portions are selected from the group consisting of hydrocarbon, oxahydrocarbon and thiahydrocarbon groups and in which the free valences are in the aliphatic portions, and wherein the mercapto groups are attached to different carbon atoms, the total number of mols of acid chloride being equal to the total number of mols of dimercaptan.

10. A method of preparing polythioesters which comprises mixing at least one acid chloride of a dibasic acid having the structural formula

wherein R is a divalent radical of the group consisting of aliphatic hydrocarbon, oxahydrocarbon and thiahydrocarbon radicals, and aromatic hydrocarbon radicals, and wherein the carbonyl groups are attached to different carbon atoms, and at least one dimercaptan having the structural formula

HS—R'—SH wherein R' is a divalent radical of the group consisting of aliphatic hydrocarbon, oxahydrocarbon and thiahydrocarbon radicals, arylene radicals, and araliphatic radicals in which the aromatic portion is hydrocarbon and in which the aliphatic portions are selected from the group consisting of hydrocarbon, oxahydrocarbon and thiahydrocarbon groups and in which the free valences are in the aliphatic portions, and wherein the mercapto groups are attached to different carbon atoms, the total number of mols of acid chloride being equal to the total number of mols of dimercaptan.

PAUL J. FLORY.

REFERENCES CITED

The following references are of record in the file of this patent:

UNITED STATES PATENTS

| Number | Name | Date |
|---|---|---|
| 1,984,417 | Mark et al. | Dec. 18, 1934 |
| 2,012,267 | Carothers | Aug. 27, 1935 |
| 2,149,857 | Mikeska et al. | Mar. 7, 1939 |

OTHER REFERENCES

Ser. No. 352,267, Schlack (A. P. C.), published April 20, 1943.